Jan. 8, 1935. O. C. ROBY 1,987,268
PLOW
Filed June 4, 1934
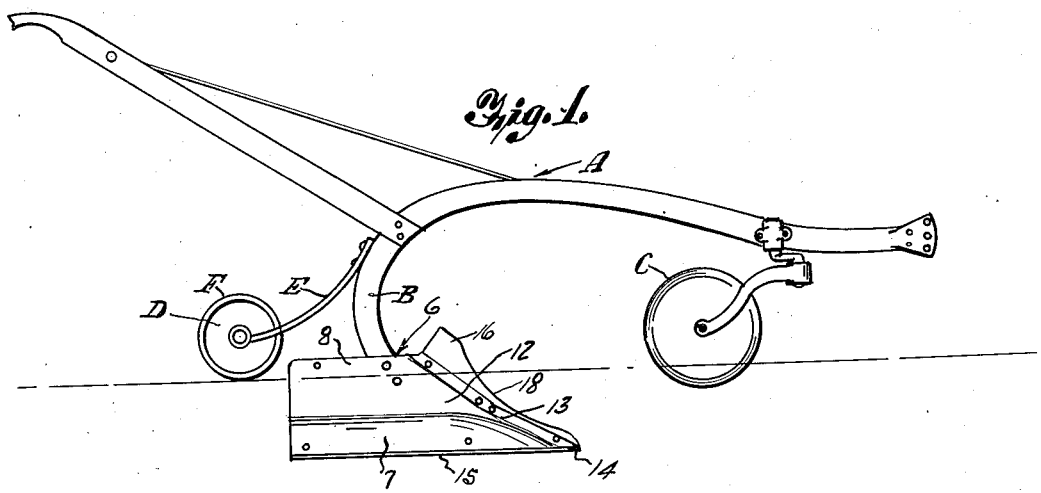
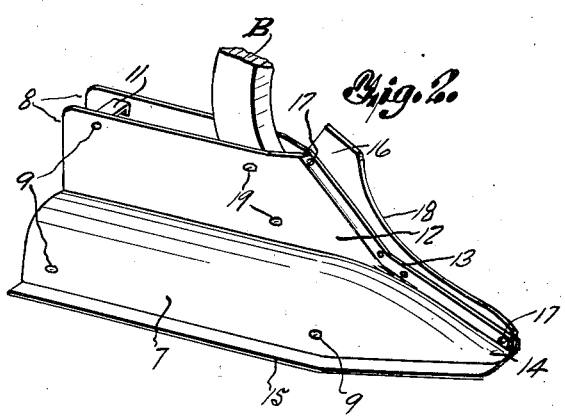
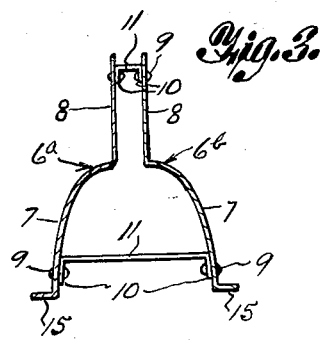
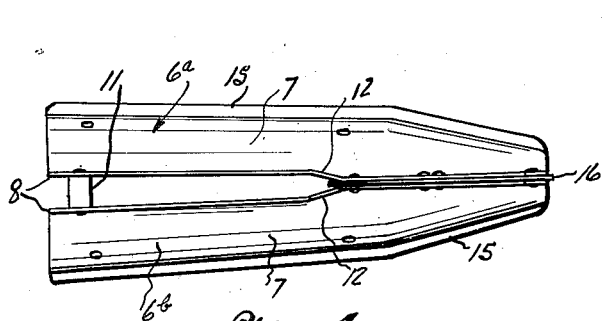
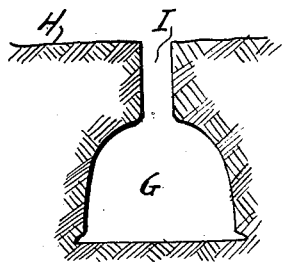
INVENTOR
OLIVER C. ROBY
By Adam E. Fisher
ATTORNEY Patented Jan. 8, 1935

1,987,268

UNITED STATES PATENT OFFICE 1,987,268

PLOW

Oliver C. Roby, Rocheport, Mo.

Application June 4, 1934, Serial No. 728,911

3 Claims. (Cl. 37—193)

My invention relates to improvements in plows and the main object is to provide an improved mole or drainage plow share which when drawn through the ground will form a relatively large ditch or trench below the ground line and with a restricted narrow slot or opening communicating with the top of the ground whereby surplus surface water may run into said ditch and thus work rapidly into the ground or flow off, all without forming any large open ditches in the field. The plow is thus of particular use in draining pastures and like uses.

Another object is to provide a plow share of this kind of elongated shoe like form made up of two sides or side plates formed and secured together to provide a relatively wide lower ditch forming portion rounded on the sides and flat across the open bottom and inset substantially parallel upper webs or top sides designed to form the restricted channel or opening through the top of the ground, the said sides being joined and converging toward their frontal ends to form a sharp pointed and edged nose to penetrate the ground, there being a breaker plate secured between said frontal ends and space between the sides near their upper side to receive the plow post or stock for securing the share thereto.

With these and other objects in view the invention resides in the novel construction and arrangement of parts as hereinafter fully set forth and claimed, reference being had to the accompanying drawing wherein:

Figure 1 is a side view of a drainage or mole plow having my improved share.

Figure 2 is a perspective view of the share and a fragment of the plow foot or stock.

Figure 3 is a vertical cross section through the share.

Figure 4 is a plan view of the share.

Figure 5 is a cross sectional view showing the form and shape of drainage ditch formed with my plow.

Referring now with more particularity to the drawing my improved share designated generally at 6 is made up of two complementary plates or sheets 6a and 6b of metal bent and formed to provide bulging or rounded lower portions 7 and flat, inset upper portions 8. These two plates are secured together with the flat upper portions 8 relatively close together, the fastening being by rivets 9 through the ends 10 of connecting braces or arms 11 as shown. The frontal ends 12 of both these upper and lower portions converge to form a sharp entering edge 13 which is cut off angularly downward and forward from top to bottom to provide a relatively sharp nose 14. The lower margins of the plates 6a and 6b are bent outward in the form of flat horizontal flanges 15. A flat elongated breaker plate 16 is secured between the frontal ends 12 by rivets or bolts 17, and same has an arcuate and concaved sharp cutting or entering edge 18.

The share, constructed as above, may be used on any form of plow or plow stock as for instance that shown at A in Figure 1. This plow, known as a walking plow, has an arcuate foot 13 which is placed between the upper portions 8 of the share sides and secured by bolts 19 passed through the sides and the foot. To facilitate the use of the share a conventional rolling coulter C is mounted forwardly of the share to break through the ground and a packing wheel D is mounted in an arm E rearwardly of the share, the wheel having a wide flat peripheral face F.

In use the share is drawn through the ground so that the rounding lower portion 7 forms a dome-shaped relatively large ditch or trench G in the ground H (Figure 5) and the upper portion 8 forms a narrow slot or opening I connecting the trench G with the top of the ground. The following packing wheel D smooths off and flattens the ground along the opening I. Surface water may thus run down through the opening I into the tranch G and then be carried away or enter the soil. The share is thus of great utility in draining ground particularly in pastures, etc.

While I have herein set forth a certain preferred embodiment of my invention, it is underferred that I may vary from the same in minor structural details, so as best to construct a practical device for the purpose intended, not departing from the spirit of the invention and within the scope of the appended claims.

I claim:

1. A plow share comprising a pair of complementary sides bulged and rounded outwardly along their lower portions and flat along their upper portions, the two sides being secured together in spaced relation, braces extended between the sides, the frontal ends of the sides converging and being cut off angularly downward and forward, a breaker plate secured between the frontal ends of said sides, the said breaker plate having an arcuate, concaved exposed edge, and the lower margins of the sides being flanged and turned outward horizontally.

2. A plow share comprising a pair of complementary sides mounted together in spaced relation and bulged and rounded outwardly along their lower portions, the said sides converging toward their frontal ends and flanged outwardly along their lower margins, and a breaker plate secured between the said converging frontal ends of the sides.

3. A plow share comprising a pair of complementary sides mounted together in spaced relation and being rounded outwardly and downwardly along their lower extremities, the said sides converging toward their frontal ends and being cut off angularly downwardly and forwardly from their upper to their lower edges, and an arcuate and concaved breaker plate secured between these converging and sloping frontal ends of the said sides.

OLIVER C. ROBY.